United States Patent [19]
Lim

[11] Patent Number: 5,347,320
[45] Date of Patent: Sep. 13, 1994

[54] CIRCUIT FOR PREVENTING AUTOMATIC WHITE BALANCE ERROR OPERATION

[75] Inventor: Jong-Gyun Lim, Kyonggi-do, Rep. of Korea

[73] Assignee: Samsung Electronics Co., Ltd., Kyonggi-do, Rep. of Korea

[21] Appl. No.: 963,547

[22] Filed: Oct. 20, 1992

[30] Foreign Application Priority Data

Nov. 30, 1991 [KR] Rep. of Korea ............... 91-21063

[51] Int. Cl.⁵ .................... H04N 9/73; H04N 9/04
[52] U.S. Cl. .................... 348/655; 348/363
[58] Field of Search ........ 358/29, 29 C, 41, 909, 358/228; 348/363, 655; H04N 9/73, 9/04

[56] References Cited
FOREIGN PATENT DOCUMENTS

| 312484 | 12/1990 | Japan | H04N 9/73 |
| 165686 | 7/1991 | Japan | H04N 9/73 |
| 171988 | 7/1991 | Japan | H04N 9/73 |
| 137988 | 5/1992 | Japan | H04N 9/73 |

*Primary Examiner*—James J. Groody
*Assistant Examiner*—Glenton B. Burgess
*Attorney, Agent, or Firm*—Sughrue, Mion, Zinn, Macpeak & Seas

[57] ABSTRACT

An error operation in a white balance circuit is prevented from occurring. This error operation occurs when a white balance control is mistakenly executed upon recognizing that a color temperature of the environment is changed during a counter light correction either when an iris is adjusted or when an amplifying gain in an amplifying stage is controlled. The counter light correcting function is executed in order to account for the fact that an object appears shaded in the vicinity of a bright background. The error operation is prevented by maintaining the white balance correction at a present state when a voltage from a counter light correction circuit becomes greater than a reference voltage.

3 Claims, 3 Drawing Sheets

CIRCUIT FOR PREVENTING AUTOMATIC WHITE BALANCE ERROR OPERATION

FIELD OF THE INVENTION

The present invention relates to a camera (camcorder, official camera, broadcasting camera, etc.) having an automatic white balance circuit for improving color reproductivity, and more particularly to a circuit for preventing an error from occurring in the operation of the white balance circuit.

BACKGROUND OF THE INVENTION

Recently, as new techniques relating to cameras are being developed, the color reproductivity is surprisingly increasing in quality. Particularly, a white balance control technique has been developed for reproducing a color temperature signal which varies in response to an illumination received from an object and transforming it into a color peculiar to the object by performing a correction during a video signal processing course. This white balance control technique has caused the color reproductivity process to be greatly improved.

In addition, a counter light correction operation has been known in the prior art for correcting for the fact that an object appears shaded if that object is in the vicinity of a bright background. One type of counter light correction involves changing an iris opening reference voltage so as to alter the opening of an iris. Another type involves controlling the amplifying gain of a video signal processing section.

In the above-described conventional white balance control technique, when a user intends to execute a counter light correction by changing an iris opening reference voltage or by controlling the amplifying gain in the amplifying stage during a processing operation of the separated video signal, the camera judges that the color temperature of the environment is changed and executes an undesired white balance control, thus lowering the quality of the color reproductivity of the camera.

That is, there has been a problem in the prior art in that during counter light correction despite the fact that the color temperature of the input signal is not changed, the camera mistakenly judges a change of a signal from a counter light correction device as being a change in the color temperature and thereby executes the white balance control so that the color reproductivity becomes worse.

Accordingly, in Japanese laid open patent publication Sho-62(1987)-175090(Title of invention: Color video camera), there is disclosed a technique in which an iris condition is detected, and the gain of a white balance circuit is controlled in response to the detected iris condition and thereby the color balance correction is executed.

However, in the case of the aforementioned Japanese laid open patent publication Sho-62-175090, although the color reproductivity is increased to a certain degree by executing the white balance correction in response to the iris condition, a fundamental solution could not be offered.

That is, with this conventional device there has been a problem in that since the white balance correction is executed in response to the iris condition, the white balance correction is continually executed even during counter light correction so that the overall quality of the color reproductivity is reduced.

SUMMARY OF THE INVENTION

Accordingly, it is an object of the present invention to provide a circuit for preventing an automatic white balance error operation which serves to increase the quality of a color reproductivity operation of a camcorder by stopping the white balance operation while executing the counter light correction.

The automatic white balance error operation preventing circuit in accordance with the present invention for attaining the above-mentioned object includes a counter light correcting circuit which corrects for the phenomenon that an object appears shaded when in the vicinity of a bright background, and a comparing circuit for maintaining a present white balance state by outputting a control signal when the counter light correcting voltage outputted from the counter light correcting circuit is greater than a reference value.

DETAILED DESCRIPTION OF THE INVENTION

Figure 1:
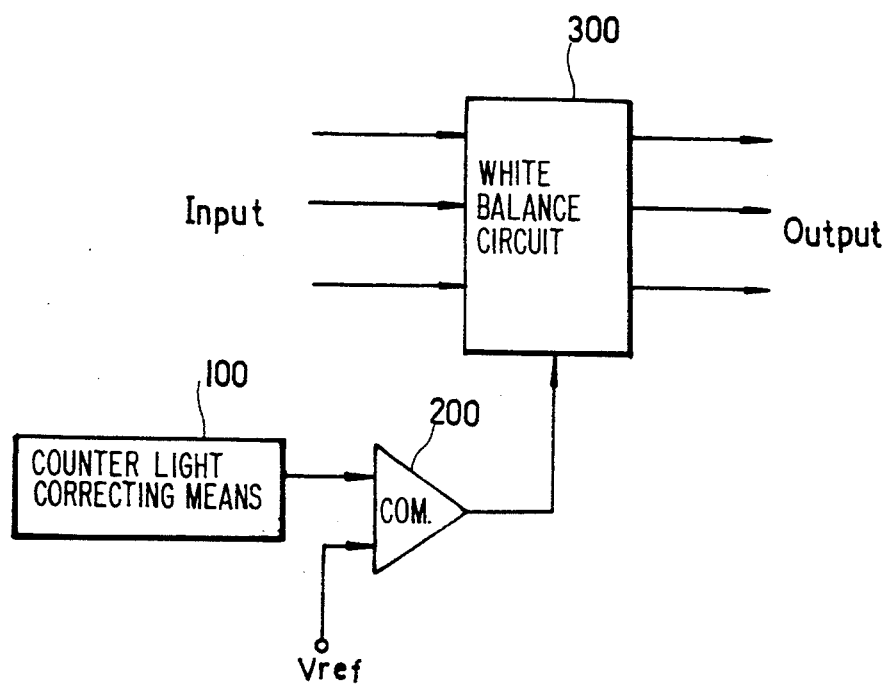
FIG. 1 is a block diagram of an automatic white balance error operation preventing circuit in accordance with the present invention.

As shown in FIG. 1, the automatic white balance error operation preventing circuit of the present invention includes a counter light correcting circuit 100 for correcting for a phenomenon that an object appears to be shaded when in the vicinity of a bright background. It also includes a comparing circuit 200 for maintaining constant a present operating state of a white balance circuit 300 by outputting a control signal when a counter light correcting voltage outputted from the counter light correcting circuit 100 is greater than a reference value Vref.

That is, the counter light correcting circuit 100 outputs a predetermined voltage for correcting for a phenomenon that an object appears to be shaded when in the vicinity of a bright background.

The voltage outputted from the counter light correcting circuit 100 is inputted to the comparing circuit 200 which compares the voltage inputted from the counter light correcting circuit 100 and the reference voltage Vref. The comparing means 200 outputs a control signal when a voltage outputted from the counter light correcting circuit 100 is greater than the reference voltage Vref.

The control signal outputted from the comparing means 200 is inputted to a control input of the white balance circuit 300. The white balance circuit 300 maintains a present white balance correcting state when the control signal is inputted from the comparing circuit 200 and outputs a white balance corrected video signal.

As described above, the automatic white balance error operation preventing circuit prevents the error operation by maintaining the white balance correction to a present state when the voltage outputted for the counter light correction becomes more than the reference voltage.

Thus, it is possible to prevent the white balance error operation due to the color temperature around the picture being detected by the white balance circuit as having changed upon the performance of counter light correction by either controlling the iris or adjusting the amplifying gain.

Figure 2:
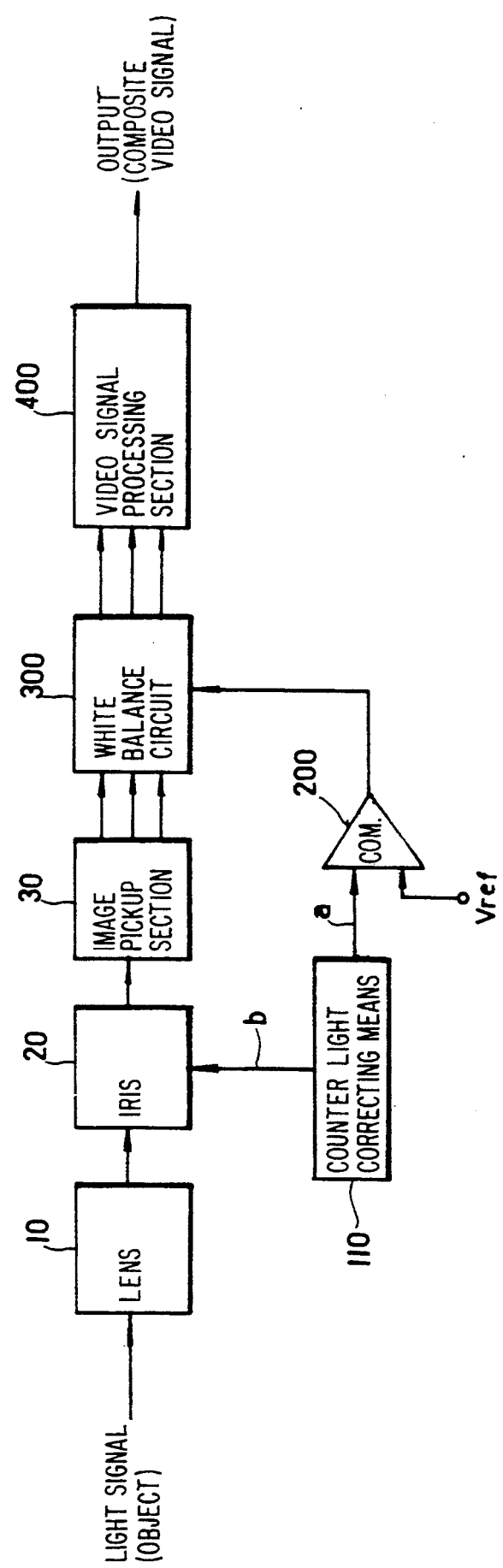
FIG. 2 is a block diagram of a preferred embodiment in accordance with the present invention.

FIG. 2 is a block diagram of an embodiment of the automatic white balance error operation preventing circuit in accordance with the present invention, and it is a circuit applying the present invention to a camera which executes the counter light correction by the control of the iris.

As seen from FIG. 2, the light being incident from the object is inputted to an image pickup section 30 though the lens 10 and the iris 20. The image pickup section 30 changes the incident light into a video signal. The video signal outputted from the image pickup section 30 is inputted to the white balance circuit 300.

When the video signal is inputted from the image pickup section 30, the white balance circuit 300 corrects the color temperature signal which varies in response to the illumination received by the object in order to reproduce a color peculiar to the object. The video signal executed with the white balance correction is processed at a video signal processing section 400 and outputted as a composite video signal.

The counter light correcting circuit 110 outputs a counter light correcting voltage (a) and at the same time outputs a corresponding iris control signal (b) to control the iris 20 to account for the fact that an object appears shaded when in the vicinity of a bright background.

The comparing circuit 200 compares the counter light correcting voltage (a) outputted from the counter light correcting circuit 110 and the reference voltage Vref. When the counter light correcting voltage (a) outputted for the counter light correction circuit 110 becomes greater than the reference voltage Vref, the comparing circuit 200 outputs a control signal so as to maintain the corrected state of the white balance circuit 300 in its present state.

Thus, when the white balance circuit 300 is inputted with the control signal from the comparing circuit 200, a present white balance correcting state is maintained and an inputted video signal is corrected and outputted. The state of the white balance circuit is not allowed to change during counter light correction.

And, the iris 20 is adjusted in its opening state in response to the iris adjusting signal (b) outputted from the counter light correcting circuit 110 so as to execute the counter light correction.

Accordingly, the automatic white balance error operation preventing circuit in accordance with the present invention can prevent an error operation from occurring. Specifically, the error which occurred in the prior art was the continued executing of the white balance adjustment which erroneously judged that the color temperature had changed at the camera during the time of counter light correction.

Figure 3:
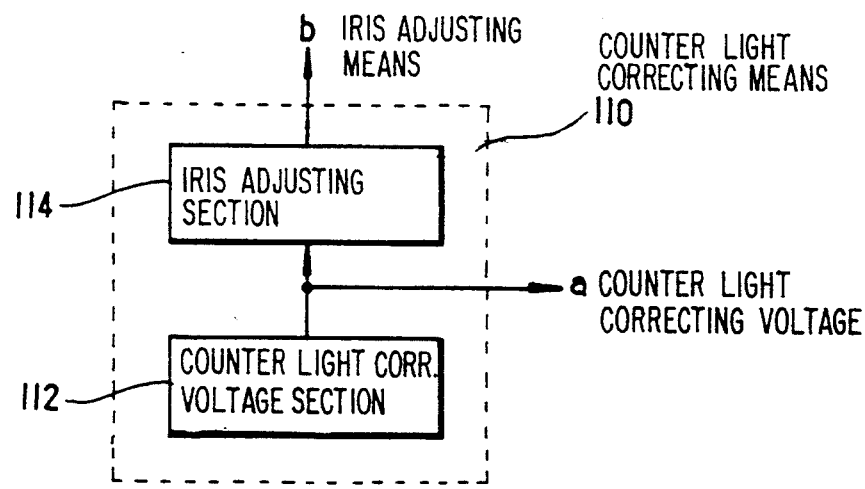
FIG. 3 is a block diagram which embodies in more detail the counter light correcting means 100 of FIG. 2.

FIG. 3 is a block diagram showing in more detail the counter light correcting circuit 110 shown in FIG. 2, and it comprises a counter light correcting voltage section 112 for outputting the counter light correcting voltage (a), and an iris adjusting section 114 for outputting the control signal (b) for adjusting the opening state of the iris in response to the counter light correcting voltage (a) outputted from the counter light correcting voltage section 112.

Accordingly, from the counter light correcting voltage section 112 the counter light correcting voltage for adjusting the opening of the iris is outputted.

The counter light correcting voltage (a) outputted from the counter light correcting voltage section 112 is inputted to the comparing means 200 of FIG. 2, and at the same time is inputted to the iris adjusting section 114.

At this moment, the comparing means 200 of FIG. 2 compares the counter light correcting voltage (a) and the reference voltage Vref, and when the counter light correcting voltage (a) becomes greater than the reference voltage Vref, the white balance correction is maintained to a present state.

And, the iris adjusting section 114 outputs the control signal for controlling the opening state of the iris 20 in response to the counter light correcting voltage (a) outputted from the counter light correcting voltage section 112.

Therefore, the camera comprising a circuit as shown in FIG. 2 prevents an error from occurring in the white balance operation during the time of the counter light correction.

Figure 4:
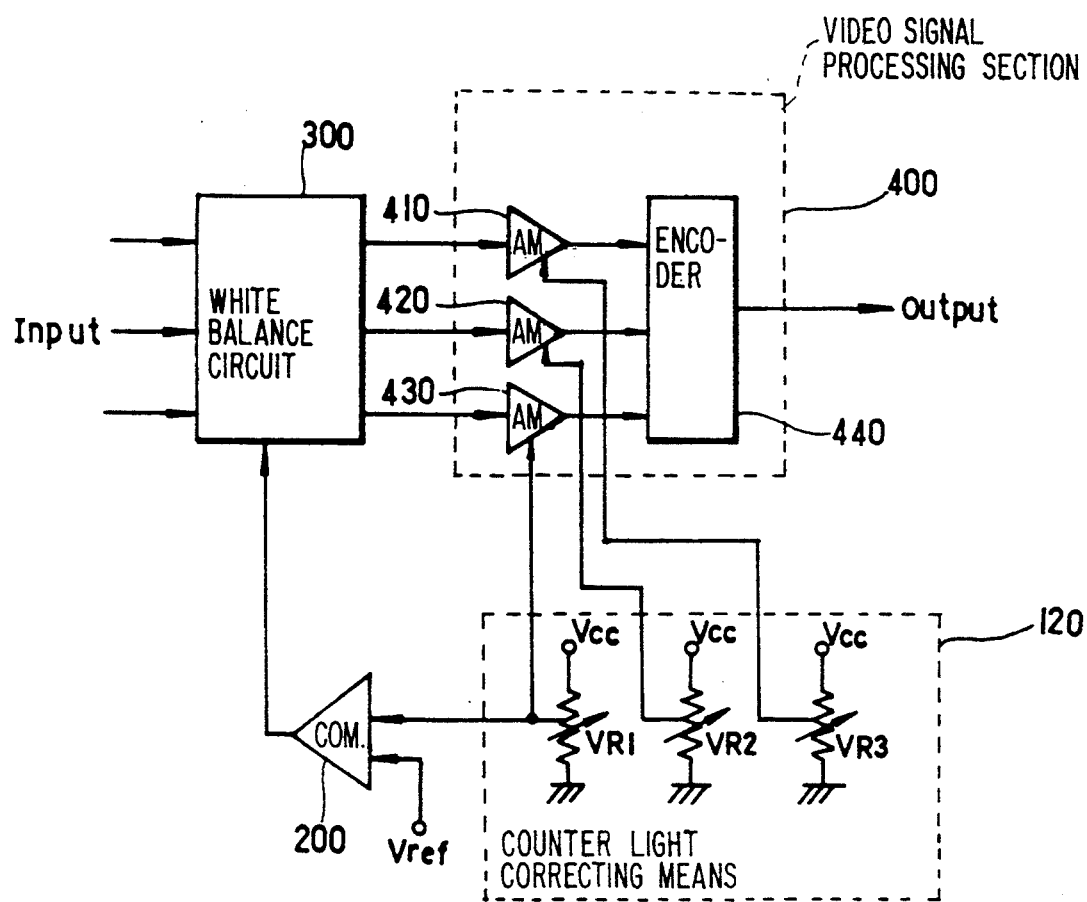
FIG. 4 is a block diagram of another embodiment of the automatic white balance error operation preventing circuit in accordance with the present invention.

FIG. 4 is a block diagram of another embodiment according to the present invention, and it is circuit diagram applying the present invention to a camera which executes the counter light correction by adjusting an amplifying gain in the amplifying stage of a video signal processing section.

As seen from FIG. 4, the video signal is inputted to the white balance circuit 300. In the white balance circuit 300, the color temperature signal which varies in response to the illumination received from the object, is corrected so as to convert it to a color peculiar to the object and then a corrected signal is outputted.

The signal outputted from the white balance circuit 300 is inputted to the video signal processing section 400 where it is amplified by the amplifiers 410, 420 and 430. The video signal amplified by the amplifiers 410, 420 and 430 is then inputted to an encoder 440 which processes the inputted video signal.

At this moment, the counter light correcting circuit 120 outputs the counter light correcting voltage by varying the resistance of the variable resistors VR1, VR2 and VR3.

The counter light correcting voltage outputted from the counter light correcting circuit 120 is inputted to the amplifiers 410, 420 and 430. The amplifying gain of the amplifiers 410, 420 and 430 are adjusted by the counter light correcting voltage outputted from the counter light correcting circuit 120, and the counter light correction is executed.

That is, because the same effect as the iris opening is obtained when a level of the signal is raised, the counter light correction is executed by adjusting the gain of the amplifiers 410, 420 and 430 amplifying the video signal (e.g., R-Y, B-Y, Y signal).

At this time, the gain of the amplifiers 410, 420 and 430 is corrected by the variable resistors VR1, VR2 and VR3 of the counter light correcting circuit 120.

Meanwhile, the counter light correcting voltage varied by the variable resistor VR1 of the counter light correcting circuit 120 is inputted to the comparing circuit 200 which compares the voltage outputted from the counter light correcting circuit 120 and the reference voltage Vref. When the voltage (a) outputted from the counter light correcting circuit 120 becomes greater than the reference voltage Vref, the comparing circuit 200 outputs the control signal to the white balance circuit 300. Then, the white balance circuit 300 maintains the white balance correcting state at a present state.

Here, a description is given only for the voltage outputted from the variable resistor VR1 of the counter light correcting circuit 120. However, the voltages outputted from the variable resistors VR2 and VR3 are also changed during the counter light correction, so the same effect can be obtained even if the operation of the white balance circuit is controlled by comparing the voltage outputted from any variable resistor with the reference voltage.

As described above, the automatic white balance error operation preventing circuit in accordance with the present invention has the effect that even during the time of the counter light correction, proper white balance operation can be maintained. Thus, the color reproductivity can be improved.

What is claimed:

1. In a camera provided with an automatic white balance circuit, an automatic white balance circuit error operation preventing circuit comprising:

counter light correcting means for executing a counter light correction, comparing means for outputting a control signal for maintaining a present white balance state when a counter light correcting voltage outputted from said counter light correcting means is greater than a reference value; and maintaining means for maintaining a present white balance correcting state when the control signal is outputted by the comparing means and outputting a white balance corrected video signal.

2. An automatic white balance circuit error operation preventing circuit as defined in claim 1, wherein said counter light correcting means comprises a counter light correcting section for outputting the counter light correcting voltage, and an iris adjusting section for outputting a second control signal for adjusting an opening state of an iris in accordance with the counter light correcting voltage outputted from said counter light correcting voltage section.

3. An automatic white balance error operation preventing circuit as defined in claim 1, wherein said counter light correcting means comprises a variable resistor for adjusting an amplifying gain of an amplifier.

* * * * *